United States Patent [19]

Nodelman et al.

[11] Patent Number: 5,739,253

[45] Date of Patent: *Apr. 14, 1998

[54] RIM ELASTOMERS BASED ON PREPOLYMERS OF CYCLOALIPHATIC DIISOCYANATES

[75] Inventors: Neil H. Nodelman, Pittsburgh; David D. Steppan, Gibsonia, both of Pa.

[73] Assignee: Bayer Corporation, Pittsburgh, Pa.

[*] Notice: The term of this patent shall not extend beyond the expiration date of Pat. No. 5,668,239.

[21] Appl. No.: 657,293

[22] Filed: Jun. 4, 1996

[51] Int. Cl.$^6$ .................. C08G 18/10; C08G 18/12; C08G 18/66; C08G 18/75

[52] U.S. Cl. .............. 528/60; 264/51; 264/328.1; 264/328.2; 264/328.6; 521/159; 521/163; 521/167; 521/172; 521/173; 521/174; 521/176; 528/59; 528/61; 528/65; 528/66; 528/67; 528/76; 528/80

[58] Field of Search ................. 521/159, 163, 521/167, 172, 173, 174, 176; 528/59, 60, 61, 65, 66, 76, 80, 67; 264/51, 328.1, 328.2, 328.6

[56] References Cited

U.S. PATENT DOCUMENTS

| | | | |
|---|---|---|---|
| 3,506,617 | 4/1970 | Collardeau et al. | 528/61 |
| 3,600,358 | 8/1971 | Taub | 528/59 |
| 3,766,148 | 10/1973 | Taub | 528/59 |
| 3,870,683 | 3/1975 | Freure et al. | 528/61 |
| 4,218,543 | 8/1980 | Weber et al. | 521/51 |
| 4,269,945 | 5/1981 | Vanderhider | 521/159 |
| 4,642,320 | 2/1987 | Turner et al. | 521/176 |
| 4,764,543 | 8/1988 | Savina | 521/160 |
| 4,772,639 | 9/1988 | Pilger et al. | 521/124 |
| 4,892,920 | 1/1990 | Quay et al. | 528/61 |
| 4,937,366 | 6/1990 | Nodelman | 521/163 |
| 5,175,230 | 12/1992 | Quay et al. | 528/61 |
| 5,194,504 | 3/1993 | Lebovits et al. | 525/131 |
| 5,260,346 | 11/1993 | Cassidy et al. | 521/159 |
| 5,502,147 | 3/1996 | Nodelman et al. | 528/49 |
| 5,502,150 | 3/1996 | Steppan et al. | 528/60 |
| 5,510,445 | 4/1996 | Haider et al. | 528/60 |
| 5,668,239 | 9/1997 | Nodelman et al. | 528/60 |

Primary Examiner—Rabon Sergent
Attorney, Agent, or Firm—Joseph C. Gil; N. Denise Brown

[57] ABSTRACT

This invention relates to a process for the production of polyurethane/urea elastomers from a reaction injection molding process of a reaction mixture on the presence of a catalyst via the one-shot process. The isocyanate component of this invention is a prepolymer based on a cycloaliphatic diisocyanate, and having an NCO content of 12–27%, an average isocyanate functionality of less than 2.3, a monomer content of greater than about 25% by weight, and containing urethane or urea groups. The isocyanate-reactive blend comprises a high molecular weight polyether polyol and a low molecular weight chain extender wherein the equivalent ratio of hydroxyl groups to amine groups of the chain extender is from 1:2 to 20:1. This invention also relates to the polyurethane/urea molded article produced by the above process.

7 Claims, No Drawings

RIM ELASTOMERS BASED ON PREPOLYMERS OF CYCLOALIPHATIC DIISOCYANATES

BACKGROUND OF THE INVENTION

This invention relates to a process for the production of polyurethane/urea elastomers from a reaction injection molding process of a reaction mixture in the presence of a catalyst via the one-shot process. The isocyanate component of this invention is a prepolymer of a cycloaliphatic diisocyanate having an NCO content of 12–27%, an average isocyanate functionality of less than 2.3, a monomer content of greater than about 25% by weight, and containing urethane or urea groups. The isocyanate-reactive blend comprises a high molecular weight polyether polyol and a low molecular weight chain extender wherein the equivalent ratio of hydroxyl groups to amine groups of the chain extender is from 1:2 to 20:1. This invention also relates to the polyurethane/urea molded elastomers produced by the above process.

The production of polyurethane moldings via the reaction injection molding (i.e. RIM) technique is well known and described in, for example, U.S. Pat. No. 4,218,543. The RIM process involves a technique of filling the mold by which highly reactive, liquid starting components are injected into the mold within a very short time by means of a high output, high pressure dosing apparatus after they have been mixed in so-called "positively controlled mixing heads".

In the production of polyurethane moldings via the RIM process, the reaction mixture generally comprises an A-side based on polyisocyanates and a B-side based on organic compounds containing isocyanate-reactive hydrogen atoms, in addition to suitable chain extenders, catalysts, blowing agents, and other additives. The polyisocyanates which are suitable for a commercial RIM process are the aromatic isocyanates such as, for example, diphenylmethane-4,4'-diisocyanate (i.e. MDI).

Various patents such as, for example, U.S. Pat. No. 4,937,366, broadly disclose cycloaliphatic isocyanates, including methylenebis(cyclohexylisocyanate), in a long list of isocyanates which are said to be suitable for use in a RIM process. However, very few of the patents which disclose that cycloaliphatic isocyanates are suitable for use in a RIM process have any working examples wherein a cycloaliphatic isocyanate is used. The RIM examples of U.S. Pat. No. 4,937,366 are all based on a prepolymer of an aromatic isocyanate.

High productivity commercial RIM processes require a 30 second demold time, and prefer mold temperatures less than about 80° C. for worker safety and energy efficiency. These are briefly described in U.S. Pat. No. 4,937,366. The RIM examples of this reference have a mold temperature of 65° C. and a demold time of 35 seconds.

U.S. Pat. No. 4,772,639 describes a process for the production of polyurethane moldings reacting organic polyisocyanates with organic compounds containing isocyanate-reactive hydrogen atoms in the presence of catalysts and auxiliary agents inside a closed mold. The isocyanate component is based on (a1) mixtures of (i) 1-isocyanate-3,3,5-trimethyl-5-isocyanatomethylcyclohexane (IPDI), and (ii) polyisocyanates containing isocyanurate groups prepared by the trimerization of a portion of the isocyanate groups of 1,6-diisocyanatohexane, or (a2) (i) IPDI and (iii) polyisocyanates containing isocyanurate groups prepared by the trimerization of a portion of the isocyanate groups of a mixture of 1,6-diisocyanatohexane and IPDI. These reaction mixtures are broadly disclosed as being suitable for RIM processing. The reference also requires unusually long demold times, i.e. from 3 to 10 minutes. These demold times are not commercially acceptable for high speed RIM production.

IPDI has NCO groups of differing reactivity due to stearic hindrances. The first NCO group reacts much more quickly than the second NCO group. This fact requires higher mold temperatures and/or longer demold times for RIM systems based on IPDI. Demold times of 3 to 10 minutes are disclosed by U.S. Pat. No. 4,772,639.

U.S. Pat. No. 4,642,320 discloses a process for the preparation of a molded polymer comprising reacting inside a closed mold a reaction mixture comprising (a) an active hydrogen containing material comprising a primary or secondary amine terminated polyether having an average equivalent weight of at least 500, (b) at least one chain extender, and (c) a (cyclo)-aliphatic polyisocyanate, polyisothiocyanate, or mixture thereof, wherein the NCX index is from about 0.6 to 1.5. This process requires that component (a) have at least 25%, and preferably 50% of its active hydrogen atoms present in the form of amine hydrogens. All of the examples disclose a system based on a HDI prepolymer with amine terminated polyethers and diethyltoluene diamine at high mold temperatures and long demold times. Although the reference discloses (cyclo)aliphatic isocyanates are suitable for this process, the mold temperatures are higher than normal, i.e. at least 90° C., and the demold times range from about 1 to 5 minutes.

U.S. Pat. No. 4,764,543 discloses aliphatic RIM systems with short demold times (~10 seconds) and low mold temperatures (~70° C.) that use very fast reacting aliphatic polyamines. This patent is restricted to total polyurea systems based on chain extenders which are cycloaliphatic diamines and polyethers which are amine-terminated polyethers, with an aliphatically bound polyisocyanate.

RIM systems are also disclosed in U.S. Pat. No. 4,269,945. These systems are based on compositions comprising a polyisocyanate, a hydroxyl-containing polyol, and a specific chain extender. The specific chain extender comprises (1) at least one component selected from the group consisting of (a) a hydroxyl-containing material which is essentially free of aliphatic amine hydrogen atoms, and (b) aromatic amine-containing materials containing at least two aromatic amine hydrogen atoms and are essentially free of aliphatic amine hydrogen atoms; and (2) at least one aliphatic amine-containing material having at least one primary amine group and an average aliphatic amine hydrogen functionality of from about 2 to 16. Both aromatic polyisocyanates and (cyclo)aliphatic polyisocyanates are disclosed as being suitable for this process. All of the working examples in this patent use aromatic isocyanates that may be polymeric in nature. Demold times of 60 seconds are disclosed for the examples even though comparatively faster reacting aromatic isocyanates are used.

U.S. Pat. No. 5,260,346 also discloses reaction systems for preparing elastomers via the RIM process. These systems require an allophanate modified polyisocyanate, a hydroxyl group containing polyol, and an aromatic polyamine having at least one of the positions ortho to the amine substituted with a lower alkyl substituent.

U.S. Pat. No. 5,502,147, which is commonly assigned, describes (cyclo)aliphatic isocyanate based RIM systems. These (cyclo)aliphatic isocyanates have a viscosity of less than 20,000 mPa.s at 25° C., an NCO functionality of 2.3 to 4.0, and are modified by isocyanurate groups, biuret groups, urethane groups, allophanate groups, carbodiimide groups, oxadiazine-trione groups, uretdione groups, and blends thereof. All of the working examples of this application use hexamethylene diisocyanate which is modified by one of the above groups.

U.S. Pat. No. 5,502,150, which is commonly assigned, discloses a RIM process which uses a hexamethylene diisocyanate prepolymer having a functionality of less than 2.3, an NCO content of 5 to 25%, and a monomer content of less than 2% by weight. This prepolymer is reacted with a high molecular weight isocyanate-reactive compound, a chain extender selected from diols and aminoalcohols, and a hydroxyl-based crosslinking compound containing no more than one (1) aliphatic amine hydrogen atom.

Copending application Ser. No. 08/484,402, filed Jun. 7, 1995, which is commonly assigned, discloses a method of producing window gaskets of polyurethane/urea compositions. These polyurethane/urea compositions comprise a (cyclo)aliphatic polyisocyanate having a viscosity of less than 25,000 mPa.s at 25° C. and an average NCO functionality of about 2.0 to 4.0, with an isocyanate-reactive composition comprising a high molecular weight isocyanate-reactive component and a low molecular weight chain extender, in the presence of a catalyst wherein the reactive components are selected such that the final polyurethane/urea composition has a crosslink density of at least 0.3 moles/kg.

Advantages of the presently claimed invention include the fact that expensive ATPEs do not have to be used as the high molecular weight component of the polyol blend. In comparison to U.S. Pat. No. 5,502,150, the prepolymer of the present invention does not have to undergo an expensive stripping step. The low functionality prepolymer of the present invention also results in better elastomeric properties than the higher functionality modified isocyanates of U.S. Pat. No. 5,502,147.

SUMMARY OF THE INVENTION

This invention relates to a process for the production of a polyurethane/urea elastomer from a reaction injection molding process by processing a specific reaction mixture via the one-shot process at an isocyanate index of from 80 to 130, preferably from 90 to 115. The reaction mixture comprises:

A) a cycloaliphatic diisocyanate prepolymer having an isocyanate group content of from 12 to 27% by weight, preferably 15–27% by weight, an average isocyanate functionality of less than 2.3, having a monomer content of greater than about 25%, preferably greater than about 35%, and most preferably greater than about 45% by weight, and containing urethane or urea groups, said prepolymer being prepared by reacting
   A1) a cycloaliphatic diisocyanate
with
   A2) at least one compound selected from the group consisting of:
      a) at least 6.5%, preferably at least 7.5% by weight of one or more compounds containing at least 2 hydroxyl or amine groups, preferably 2 to 4 hydroxyl or amine groups, and having a molecular weight of less than 500,
   and
      b) at least 10, preferably at least 15% by weight of a compound having a molecular weight of at least about 600 and preferably of at least about 1000, and containing polytetramethyleneoxy groups, polyethyleneoxy groups, or polyester groups, and
B) an isocyanate-reactive blend comprising:
   B1) from 55 to 90%, preferably from about 60 to 80% by weight of one or more polyether polyols having number average molecular weights of from about 1000 to about 8000, preferably 2000 to 6500, and containing from 1.5 to 4, preferably 1.8 to 3 hydroxyl groups,
   B2) from 10 to 45%, preferably from about 20 to 40% by weight of a mixture of organic chain extenders having molecular weights of from about 60 to about 500, and being selected from the group consisting of diols, triols, primary amines, secondary amines, amino alcohols, and mixtures thereof, wherein said mixture of chain extenders has an OH:NH equivalent ratio of from 1:2 to 20:1, and preferably from 1:1 to 10:1,
   with the %'s by weight of components B1) and B2) totalling 100%,
and
C) from 0.1 to 10% by weight, based upon 100% by weight of component B), of one or more catalyst for catalyzing the reaction between the isocyanate groups and the isocyanate-reactive groups.

The present invention also relates to the polyurethane/urea molded elastomers produced by the above process.

DESCRIPTION OF THE INVENTION

Suitable isocyanates for the presently claimed invention are cycloaliphatic diisocyanate prepolymers having the above specified NCO contents, average isocyanate functionalities, monomer contents, and containing urethane or urea groups. These cycloaliphatic diisocyanate prepolymers are prepared by reacting a cycloaliphatic diisocyanate with a suitable isocyanate-reactive compound.

Suitable cycloaliphatic diisocyanates for preparing the prepolymers of this invention include, for example, isophorone diisocyanate, methylenebis-(cyclohexyl isocyanate), cyclohexane diisocyanate, 1,3-diisocyanato-4-methylcyclohexane and its isomers, 1,3-diisocyanato-4methylcyclohexane. Of these, isophorone diisocyanate and methylenebis(cyclohexyl isocyanate) are preferred.

Suitable isocyanate-reactive compounds for preparing the isocyanate prepolymers include A2)a) compounds having molecular weights of less than 500, and containing at least two hydroxyl or amine groups, and A2)b) compounds having molecular weight of at least about 600, preferably at least about 1000, and which contain polytetramethyleneoxy groups, polyethyleneoxy groups or polyester groups.

Suitable compounds containing at least two hydroxyl groups and having molecular weights of less than 500 to be used in the preparation of the prepolymer include compounds such as, for example, 2-methyl-1,3-propanediol, ethylene glycol, 1,2- and 1,3-propanediol, 1,3- and 1,4- and 2,3-butanediol, 1,6-hexanediol, 1,10-decanediol, diethylene glycol, triethylene glycol, tetraethylene glycol, dipropylene glycol, tripropylene glycol, glycerol, trimethylolpropane, neopentyl glycol, 2,2,4-trimethylpentane-1,3-diol, and cyclohexanedimethanol. Preferred hydroxyl group containing compounds are polyethyleneoxy and/or polypropyleneoxy adducts of glycols and triols such as propylene glycol, ethylene glycol, glycerol, trimethylolpropane, tripropylene glycol, etc. Also, included are compounds such as PolyTHF 250, a commercially available polytetramethyleneoxy glycol from BASF. Most preferred hydroxyl group containing compounds are propyleneoxy adducts of trimethylolpropane or glycerol, and PolyTHF 250.

Suitable amine compounds to be used in the preparation of the isocyanate prepolymers include, for example, the so-called amine terminated polyethers (ATPEs) having low molecular weights. The suitable amine terminated polyethers include, for example, those containing primary or secondary, aromatically or aliphatically bound amino groups, wherein amino end groups can also be attached to the polyether chain through urethane or ester groups. Suitable compounds include, for example, Jeffamine T-403, Jeffamine D-400 and Jeffamine D-230. These low molecular weight amine terminated polyethers can be prepared by any of several methods known in the art.

The isocyanate prepolymer can also be prepared from A2)b) compounds having molecular weights of at least about 600, preferably at least about 1000, which contain polytetramethyleneoxy groups, polyethyleneoxy groups or polyester groups. Suitable examples of these compounds are PolyTHF 650, PolyTHF 1000, PolyTHF 2000, PolyTHF 2900, PolyTHF 4500, etc., commercially available from BASF; Terethane 1000 and Terethane 2000, commercially available from DuPont; Carbowax 600, commercially available from Union Carbide; and polyneopentyl adipates such as, for example, Fomrez 55-56, Fomrez 55-112, and Fomrez 55-225, commercially available from Witco. Preferred compounds are PolyTHF 1000 (Terethane 1000) and PolyTHF 2000 (Terethane 2000).

The isocyanate prepolymers of the present invention can be prepared, for example, by blending the polyol and isocyanate under a nitrogen blanket or sparge, optionally, in the presence of a catalyst, for example, 0.02% of T-9, stannous octoate, and heating to about 105° C. for between 4 and 12 hours. The reaction is monitored by %NCO titration. Other suitable processes for the preparation of prepolymers which are known can also be used.

Also necessary for preparing the polyurethane/urea elastomers via the RIM process is an isocyanate reactive component, i.e. component B). According to the present invention, component B) comprises B1) from about 55 to 90%, preferably about 60 to 80% by weight of one or more polyether polyols containing from 2 to 4 hydroxyl groups; and B2) from about 10 to 45%, preferably about 20 to 40% by weight of one or more organic chain extenders.

Suitable polyether polyols to be used as component B1) of the invention, include hydroxyl terminated polyethers suitable for use in accordance with the invention are known and may be obtained, for example, by polymerizing tetrahydrofuran or epoxides such as, for example, ethylene oxide, propylene oxide, butylene oxide, styrene oxide or epichlorohydrin in the presence of suitable catalysts, such as, for example, $BF_3$ or KOH, or by chemically adding these epoxides, preferably, ethylene oxide and propylene oxide, in admixture or successively to components containing reactive hydrogen atoms such as water, alcohols or amines. Examples of suitable alcohols and amines include the low molecular weight chain extenders set forth hereinafter, propylene glycol, glycerin, ethylene glycol, triethanolamine, water, trimethylolpropane, bisphenol A, sucrose, aniline, ammonia, ethanolamine and ethylene diamine. It is preferred to use polyethers which contain substantial amounts of primary hydroxyl groups in terminal positions (greater than 80% by weight, based on all of the terminal hydroxyl groups present in the polyether).

Preferred polyether polyols preferably to be used as component B1) include, for example, those compounds based on di- or tri-functional starters such as, for example, water, ethylene glycol, propylene glycol, glycerin, trimethylolpropane, or triethanolamine. These preferred compounds include copolymers of ethylene oxide and propylene oxide with greater than 10% by weight of the oxides being ethylene oxides.

The isocyanate-reactive component B) additionally comprises component B2) one or more organic chain extenders. Suitable organic chain extenders to be used as component B2) have a molecular weight of from about 60 to 500, preferably from 61 to 400. Suitable chain extenders are selected from the group consisting of diols, triols, primary amines, secondary amines, amino alcohols and mixtures thereof, wherein the OH:NH equivalent ratio of the chain extender (or chain extender mixture) is from 1:2 to 20:1, preferably from 1:1 to 10:1.

Suitable organic diols and triols to be used as component B2) according to the invention include, for example, diols and triols having molecular weights as described above, include, for example, 2-methyl-1,3-propanediol, ethylene glycol, 1,2-and 1,3-propanediol, 1,3-and 1,4- and 2,3-butanediol, 1,6-hexanediol, 1,10-decanediol, diethylene glycol, triethylene glycol, triethanolamine, tetraethylene glycol, dipropylene glycol, tripropylene glycol, glycerol, trimethylolpropane, neopentyl glycol, 2,2,4-trimethylpentane-1,3-diol, and cyclohexanedimethanol. Preferred diols and triols include, for example, 1,4-butanediol, 2-methyl-1,3-propanediol, ethylene glycol, triethanolamine and trimethylolpropane.

Suitable amine compounds to be used as component B2) according to the invention include organic primary amines, secondary amines, and amino alcohols having molecular weights as described above include, for example, 2-methyl-1,5-pentane diamine, diethanolamine, monoethanolamine, monoisopropanolamine, diisopropanolamine, ethylene diamine, 1,3-diaminopropane, 1,4-diaminobutane, isophoronediamine, diethylenetriamine, ethanolamine, aminoethylethanolamine, diaminocyclohexane, hexamethylenediamine, methyliminobispropylamine, iminobispropylamine, bis(aminopropyl)-piperazine, aminoethyl piperazine, 1,2-diaminocyclohexane, polyoxyalkyleneamines, bis-(p-aminocyclohexyl)methane, triethylenetetramine, tetraethylenepentamine, mixtures thereof, and the like.

Other suitable amines include, for example, 1,8-p-diaminomenthane, bis(4-aminocyclohexyl)methane, bis(4-amino-3-methyl-cyclohexyl)-methane, bis(4-amino-3,5-dimethylcyclohexyl)methane, bis(4-amino-2,3,5-trimethylcyclohexyl)methane, 1,1-bis(4-aminocyclohexyl)propane, 2,2-(bis(4-aminocyclohexyl)propane, 1,1 -bis(4-aminocyclohexyl)ethane, 1,1-bis(4-aminocyclohexyl)butane, 2,2-bis(4-aminocyclohexyl)butane, 1,1-bis(4-amino-3-methylcyclohexyl)ethane, 2,2bis(4-amino-3-methylcyclohexyl)propane, 1,1 -bis(4-amino-3,5-dimethylcyclohexyl)ethane, 2,2-bis(4-amino-3,5-dimethylcyclohexyl)propane, 2,2-bis(4-amino-3,5-dimethylcyclohexyl)butane, 2,4-diaminodicyclohexylmethane, 4-aminocyclohexyl-4-amino-3-methyl-cyclohexylmethane, 4-amino-3,5-dimethylcyclohexyl-4-amino-3-methylcyclo-hexylmethane, and 2-(4-aminocyclohexyl)-2-(4-amino-3-methylcyclohexyl)methane.

It is also possible to use the so-called amine terminated polyethers (ATPEs) having low molecular weights. The suitable amine terminated polyethers include, for example, those containing primary or secondary (preferably primary) aromatically or aliphatically (preferably aliphatically) bound amino groups, wherein amino end groups can also be attached to the polyether chain through urethane or ester groups. Suitable compounds include, for example, Jeffamine T-403, Jeffamine D-400 and Jeffamine D-230.

These low molecular weight amine terminated polyethers can be prepared by any of several methods known in the art. For example, amine terminated polyethers can be prepared from polyhydroxyl polyether (e.g., polypropylene glycol ethers) by a reaction with ammonia in the presence of Raney nickel and hydrogen (Belgian Patent No. 634,741). Polyoxyalkylene polyamines can be prepared by reaction of the corresponding polyol with ammonia and hydrogen in the presence of a nickel, copper, chromium catalyst (U.S. Pat. No. 3,654,370). The preparation of polyethers containing amino end groups by the hydrogenation of cyanoethylated polyoxypropylene ethers is described in German Patent 1,193,671. Other methods for the preparation of polyoxyalkylene (polyether) amines are described in U.S. Pat. Nos. 3,155,728 and 3,236,895 and in French Patent No. 1,551,605. French Patent No. 1,466,708 discloses the preparation of polyethers containing secondary amino end groups. Also useful are the polyether polyamines described in U.S. Pat. Nos. 4,396,729, 4,433,067, 4,444,910 and 4,530,941.

ATPEs obtained by the hydrolysis of compounds containing isocyanate end groups can also be employed herein. For example, in a process disclosed in German Offenlegungsschrift 2,948,419, polyethers containing hydroxyl groups (preferably two or three hydroxyl groups) react with polyisocyanate groups and are then hydrolyzed in a second step to amino groups. Preferred amine terminated polyethers are prepared by hydrolyzing an isocyanate compound having an isocyanate group content of from 0.5 to 40% by weight. The most preferred polyethers are prepared by first reacting a polyether containing two or four hydroxyl groups with an excess of an aromatic polyisocyanate to form an isocyanate terminated prepolymer and then converting the isocyanate groups to amino groups by hydrolysis.

Processes for the production of useful amine terminated polyethers using isocyanate hydrolysis techniques are described in U.S. Pat. Nos. 4,386,218, 4,456,730, 4,472,568, 4,501,873, 4,515,923, 4,525,534, 4,540,720, 4,578,500 and 4,565,645; European Patent 097,299; and German Offenlegungsschrift 2,948,419, all the disclosures of which are herein incorporated by reference. Similar products are also described in U.S. Pat. Nos. 4,506,039, 4,525,590, 4,532,266, 4,532,317, 4,723,032, 4,724,252, 4,855,504, 4,931,595 5,283,364 and in U.S. application Ser. No. 908,535 (filed Sep. 16, 1986, abandoned), the disclosures of which are hereby incorporated by reference.

The amine terminated polyethers used in the present invention are in many cases mixtures with any of the above-mentioned compounds.

Preferred amine compounds for component B2) include diethanolamine, monoethanolamine, and low molecular weight amine terminated polyethers such as, for example, Jeffamine T-403 and Jeffamine D-400.

Aromatic diamines are preferably not included as part of the chain extender mixture.

The process of the invention also requires at least one catalyst capable of catalyzing the reaction between the isocyanate groups of A) and the isocyanate-reactive groups of B). It is preferred that the catalyst(s) is optimized both in terms of quantity and chemical composition so as to achieve a 30s demold time in the process.

In a preferred embodiment, the catalyst comprises C1) at least one catalyst selected from the group consisting of metal carboxylates, metal halides, ammonium carboxylates, and mixtures thereof. Of the metal halides, the metal chlorides are preferred. These catalysts may be used alone or in conjunction with C2) at least one tin-sulfur catalyst, and/or C3) at least one tertiary amine catalyst.

Some examples of catalysts suitable for use as C1) catalysts include metal carboxylates including, for example, tin carboxylates such as, for example, dimethyltin dilaurate, dibutyltin dilaurate and bismuth carboxylates, such as, for example, bismuth trineodecanoate. Some suitable examples of metal halides include, for example, tin halides and especially tin chlorides, such as, for example, dimethyltin dichloride. Suitable examples of ammonium carboxylates include, for example, trimethylhydroxy-ethylammonium-2-ethylhexanoate (i.e., Dabco TMR). Tin carboxylates such as, for example, dimethyltin dilaurate and dibutyltin dilaurate, and bismuth carboxylates, such as, for example, bismuth trineodecanoate are preferred catalysts to be used as component C1). Metal chlorides, such as, for example, dimethyltin dichloride are also preferred catalysts to be used as component C1).

Suitable compounds to be used as tin-sulfur catalysts C2) include, for example, dialkyltin dilaurylmercaptides, such as, for example, dibutyltin dilaurylmercaptide and dimethyltin dilaurylmercaptide.

Suitable catalysts to be used as tertiary amine catalysts C3) include, for example, triethylamine, triethylenediamine, tributylamine, N-methylmorpholine, N-ethylmorpholine, triethanolamine, triisopropanolamine, N-methyldiethanolamine, N-ethyldiethanolamine, and N,N-dimethylethanolamine.

Other additives which may be used in the RIM process according to the present invention include surface-active additives such as emulsifiers and foam stabilizers. Examples include N-stearyl-N',N'-bishydroxyethyl urea, oleyl polyoxyethylene amide, stearyl diethanol amide, isostearyl diethanolamide, polyoxyethylene glycol monoleate, a pentaerythritol/adipic acid/oleic acid ester, a hydroxy ethyl imidazole derivative of oleic acid, N-stearyl propylene diamine and the sodium salts of castor oil sulfonates or of fatty acids. Alkali metal or ammonium salts of sulfonic acid such as dodecyl benzene sulfonic acid or dinaphthyl methane sulfonic acid and also fatty acids may also be used as surface-active additives.

Suitable foam stabilizers include water-soluble polyether siloxanes. The structure of these compounds is generally such that a copolymer of ethylene oxide and propylene oxide is attached to a polydimethyl siloxane radical. Such foam stabilizers are described, for example, in U.S. Pat. No. 2,764,565. In addition to the catalysts and surface-active agents, other additives which may be used in the molding compositions of the present invention include known blowing agents including nitrogen, cell regulators, flame retarding agents, plasticizers, antioxidants, UV stabilizers, adhesion promoters, dyes, fillers and reinforcing agents such as glass in the form of fibers or flakes or carbon fibers. Suitable antioxidants include, for example, Irganox 245. Suitable stabilizers include UV absorbers such as, for example, Tinuvin 328, and hindered amine light stabilizers (HALS) such as, for example, Tinuvin 765. However, any of the known antioxidants and/or UV stabilizers may be used. As set forth hereinabove, specific advantages have been found in reaction mixtures containing antioxidants and/or UV stabilizers have been added.

It is also possible to use the known internal mold release agents, such as, for example, zinc stearate, in the RIM process of the invention. As is known to one of ordinary skill in the art, in the RIM process, an isocyanate, and active hydrogen containing compounds are mixed and injected into molds, wherein the reactants are allowed to react fully.

The molded elastomers of the present invention are prepared by reacting the components in a closed mold via the RIM process. The compositions according to the present invention may be molded using conventional processing techniques at isocyanate indexes ranging from about 80 to 130, preferably from 90 to 115. By the term "Isocyanate Index" (also commonly referred to as NCO index), is defined herein as the equivalents of isocyanate, divided by the total equivalents of isocyanate-reactive hydrogen containing materials, multiplied by 100.

In general, in a RIM process, two separate streams are intimately mixed and subsequently injected into a suitable mold, although it is possible to use more than two streams. The first stream contains the polyisocyanate component, while the second stream contains the isocyanate reactive components and any other additive which is to be included.

As used herein, the term "molecular weight" refers to the number average molecular weight.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

The RIM machine used to make the parts was a Hennecke RIM-DO-MAT RIM machine with a Hennecke MQ-8 mixhead. The parts were molded in an end-gated rectangular mold (3×200×300 mm). The injection pressure was 200 bar on the polyol and isocyanate side. The throughput in the mixhead was maintained at 200 g/s.

A polyol blend was made in the proportions indicated in the Table 1 below. The polyol blend was put into the RIM machine and heated to 50° C. The isocyanate for each example (see Table 1 below) was added to the RIM machine and heated to 40° C. The machine was set up for 200 bar injection pressure and 200 g/s throughput. In general, the mold temperature was increased (in increments of 5° C.) from a base level of about 70° C. if a system did not have good surface properties. If at 90–95 the system did not have good surface, we stopped the experiment and concluded that the system surface quality was unacceptable. The remaining examples were processed as indicated in Tables 1–9.

Examples 1–2, 7 and 8 are comparative examples which fall outside the scope of the claimed invention. Examples 3–6 and 9 are representative of the invention. Examples 1–2, 7 and 8 show that a cycloaliphatic diisocyanate monomer in combination with the presently required B-side does not yield parts having acceptable surface quality. Examples 3–6 and 9 show that the prepolymers based on cylcloaliphatic diisocyanates as required by the present invention yield parts with good surface quality. Good physical properties and processing behavior are obtained when good demold surface is obtained as indicated in the Tables.

Tables 1, 4 and 7 show the formulations for Examples 1–9. Tables 2, 5 and 8 show the processing details for each example. Tables 3, 6 and 9 show the physical properties for the examples from which it was possible to produce molded elastomers.

The following components were used in the formulations:

Iso A: methylenebis(cyclohexyl isocyanate) having an isomer distribution of 20% trans,trans-isomer, 46% of cis,trans-isomer and 34% of cis,cis-isomer.

Iso B: an isocyanate prepolymer prepared by reacting methylenebis(cyclohexyl isocyanate) with tripropylene glycol (TPG) in a weight ratio of 86 parts of isocyanate to 14 parts of TPG, to a final NCO content of 21.5%.

Iso C: an isocyanate prepolymer prepared by reacting methylenebis(cyclohexyl isocyanate) with Polyol F in a weight ratio of 92 parts of isocyanate to 8 parts of polyol, to a final NCO content of 26.5%.

Iso D: an isocyanate prepolymer prepared by reacting methylenebis(cyclohexyl isocyanate) with Polyol G in a weight ratio of 72 parts of isocyanate to 28 parts of polyol, to a final NCO content of 21.4%.

Iso E: an isocyanate prepolymer prepared by reacting methylenebis(cyclohexyl isocyanate) with Polyol H in a weight ratio of 72 parts of isocyanate to 28 parts of polyol, having a final NCO content of 21.4%.

Iso F: isophorone diisocyanate, having an NCO content of 37.8%.

Iso G: an isocyanate prepolymer prepared by reacting isophorone diisocyanate with Polyol F and Polyol B in a weight ratio of 78.6 parts of isocyanate to 8.1 parts of Polyol F and 13.3 parts of Polyol B, having a final NCO content of about 26%.

Polyol A: a glycerin started propylene oxide/ethylene oxide polyether (83 wt. % PO, 17 wt. % EO), having an OH number of about 60

Polyol B: a glycerin started propylene oxide/ethylene oxide polyether (83 wt. % PO, 17 wt. % EO), having an OH number of about 35

Polyol C: 2-methyl-1,3-propanediol

Polyol D: trimethylolpropane

Polyol E: a glycerin started propylene oxide/ethylene oxide polyether (82.5% PO, 17.5% EO), having an OH number of about 28

Polyol F: a trimethylolpropane staked propylene oxide polyether, having an OH number of about 550

Polyol G: a polytetramethylene polyether having an OH number of about 56, commercially available as Terethane 2000 from DuPont.

Polyol H: a propylene glycol started propylene oxide polyether, having an OH number of about 56

Polyol J: a glycerin started propylene oxide/ethylene oxide polyether (87 wt. % PO, 13 wt. % EO), having an OH number of about 28

ATPE A: a difunctional, 400 molecular weight amine terminated polypropylene glycol, commercially available from Huntsman Corporation as Jeffamine D400

AA: monoethanolamine

Catalyst A: dimethyltin dilaurate, commercially available from Witco Corporation as Fomrez UL-28

Pigment A: a blend of Polyol J (91.1 wt. %) and carbon black (8.9 wt. %)

Tinuvin 765: a HALS stabilizer, commercially available from Ciba-Geigy Inc.

Irganox 245: an antioxidant, commercially available from Ciba-Geigy Inc.

ASTM methods used were as follows:

D790 flexural modulus

D412 tensile strength; and elongation

D624 die C tear strength

TABLE 1

Formulations of Examples 1–4:

| Example | 1 | 2 | 3 | 4 |
|---|---|---|---|---|
| Polyol A | 88 | 73 | | |
| Polyol B | | | 69.5 | 72 |
| ATPE A | | 13 | 13 | 13 |
| Polyol C | | 10 | 10 | 10 |
| Polyol D | | | 2.5 | |
| AA | 10 | 2 | 3 | 3 |
| Catalyst A | 2 | 2 | 2 | 2 |
| Isocyanate | A | A | B | B |
| NCO Index | 105 | 105 | 105 | 105 |

TABLE 2

Processing Conditions of Examples 1–4:

| Example: | 1 | 2 | 3 | 4 |
|---|---|---|---|---|
| Surface: | poor[1] | poor[1] | excellent[2] | excellent[2] |
| Iso. Temp. | 40° C. | 40° C. | 45° C. | 45° C. |
| Polyol Temp. | 50° C. | 50° C. | 50° C. | 50° C. |
| Mold Temp. | 95° C. | 95° C. | 80° C. | 80° C. |
| Demold Time | 30 seconds | 30 seconds | 30 seconds | 30 seconds |

[1]: Poor surface quality; molded parts exhibited orange peel surface defects.
[2]: Excellent surface quality: molded parts exhibited smooth, high gloss surface.

TABLE 3

Physical Properties of Examples 1–4:

| Example: | 1 | 2 | 3 | 4 |
|---|---|---|---|---|
| Flex. Mod. (psi) | | | 25,000 | 10,000 |
| Elongation (%) | | | 170 | 240 |
| Tensile Strength (psi) | | | 3100 | 2550 |
| Tear Strength (pli) | | | 400 | 310 |

TABLE 4

Formulations of Examples 5–7:

| Example | 5 | 6 | 7 |
|---|---|---|---|
| Polyol B | 64 | | |
| Polyol E | | 67.5 | 67.5 |
| ATPE A | 13 | 16 | 16 |
| Polyol C | 7.5 | 12 | 12 |
| Polyol D | 2.5 | | |
| AA | 3 | 2.5 | 2.5 |
| Catalyst A | 2 | 2 | 2 |
| Irganox 245 | 1 | | |
| Tinuvin 765 | 3 | | |
| Pigment A | 4 | | |
| Iso | C | D | E |
| NCO Index | 105 | 105 | 105 |

TABLE 5

Processing Conditions for Examples 5–7:

| Example | 5 | 6 | 7 |
|---|---|---|---|
| Surface: | excellent[2] | excellent[2] | poor[1] |
| Iso. Temp | 50° C. | 55° C. | 55° C. |
| Polyol Temp. | 50° C. | 40° C. | 40° C. |
| Mold Temp. | 75° C. | 70° C. | 80° C. |
| Demold Time | 30 seconds | 30 seconds | 30 seconds |

[1]: Poor surface quality; molded parts exhibited orange peel surface defects.
[2]: Excellent surface quality: molded parts exhibited smooth, high gloss surface.

TABLE 6

Physical properties of Examples 5–7:

| Example | 5 | 6 | 7 |
|---|---|---|---|
| Flex. Mod. (psi) | 29,483 | 5704 | 3569 |
| Elongation (%) | 159 | 166 | 217 |
| Tensile Str. (psi) | 2913 | 1734 | 1754 |
| Tear Str. (pli) | 323 | 215 | 49 |

TABLE 7

Formulations of Examples 8–9:

| Example | 8 | 9 |
|---|---|---|
| Polyol B | 64 | 64 |
| Polyol C | 7.5 | 7.5 |
| Polyol D | 2.5 | 2.5 |
| ATPE A | 13 | 13 |
| AA | 3 | 3 |
| Catalyst A | 2 | 2 |
| Pigment A | 4 | 4 |
| Irganox 245 | 1 | 1 |
| Tinuvin 765 | 3 | 3 |
| Iso | F | G |
| NCO Index | 105 | 105 |

TABLE 8

Processing conditions of Examples 8–9:

| Example | 8 | 9 |
|---|---|---|
| Surface: | poor[1] | excellent[2] |
| Iso. Temp. | 50° C. | 50° C. |
| Polyol Temp. | 50° C. | 50° C. |
| Mold Temp. | 75° C. | 75° C. |
| Demold Time | 30 seconds | 30 seconds |

[1]: Poor surface quality; molded parts exhibited orange peel surface defects.
[2]: Excellent surface quality: molded parts exhibited smooth, high gloss surface.

TABLE 9

Physical Properties of Examples 8–9:

| Example | 8 | 9 |
|---|---|---|
| Flex. Mod. (psi) | 5347 | 13,220 |
| Elongation (%) | 284 | 193 |
| Tensile Str. (psi) | 2110 | 2222 |
| Tear Str. (pli) | 232 | 297 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a polyurethane/urea elastomer from a reaction mixture by a reaction injection molding process, wherein said reaction mixture comprises:

A) an isocyanate prepolymer having an isocyanate group content of from 12 to 27% by weight, an average isocyanate functionality of less than 2.3, having a monomer content of greater than about 25% by weight, and containing urethane or urea groups, said prepolymer being prepared by reacting A1) a cycloaliphatic diisocyanate with A2) at least one compound selected from the group consisting of:

a) at least 6.5% by weight, based on the combined weight of A1) and A2)a), of one or more compounds containing at least two hydroxyl or amine groups and having a molecular weight of less than 500, and b) at least 10% by weight, based on the combined weight of A1) and A2)b), of a compound having a molecular weight of at least about 600, and containing polytetramethyleneoxy groups, polyethyleneoxy groups, or polyester groups;

and

B) an isocyanate-reactive blend comprising:

B1) from 55 to 90% by weight of one or more polyether polyols having number average molecular weights of from about 1000 to about 8000 and containing from 1.5 to 4 hydroxyl groups, B2) from 10 to 45% by weight of a mixture of organic chain extenders having molecular weights of from about 60 to about 500, and being selected from the group consisting of diols, triols, primary amines, secondary amines, amino alcohols, and mixtures thereof, wherein said mixture of chain extenders has an OH:NH equivalent ratio of from 1:2 to 20:1, with the %'s by weight of components B1) and B2) totalling 100%, and C) from 0.1 to 10% by weight, based upon the weight of component B), of one or more catalyst for catalyzing the reaction between the isocyanate groups and the isocyanate-reactive groups, wherein the reaction mixture is processed via a one-shot process at an isocyanate index of from 80 to 133.

2. The process of claim 1, wherein A) said isocyanate prepolymer has an isocyanate group content of from about 15 to 27% by weight, and a monomer content of greater than about 35% by weight.

3. The process of claim 2, wherein said isocyanate prepolymer has a monomer content of greater than about 45% by weight.

4. The process of claim 1, wherein said isocyanate prepolymer is prepared by reacting A1) a cycloaliphatic diisocyanate selected from the group consisting of isophorone diisocyanate and methylenebis(cyclohexyl isocyanate), with A2) at least one compound selected from the group consisting of:

a) at least 7.5% by weight of one or more compounds containing at least two hydroxyl or amine groups and having a molecular weight of less than 500, and b) at least 15% by weight of a compound having a molecular weight of at least about 1000, and containing polytetramethyleneoxy groups, polyethyleneoxy groups, or polyester groups.

5. The process of claim 1, wherein B) said isocyanate-reactive blend comprises:

B1) from about 60 to 80% by weight of one or more polyether polyols having number average molecular weights of from about 2000 to 6500 and containing about 1.8 to 3 hydroxyl groups, and B2) from about 20 to about 40% by weight of a mixture of organic chain extenders having an OH:NH equivalent ratio of from 1:1 to 10:1.

6. The process of claim 1, wherein said mixture of organic chain extenders contains at least one compound selected from the group consisting of: 1,4-butanediol, 2-methyl-1,3-butanediol, ethylene glycol, triethanolamine, trimethylolpropane, a low molecular weight amine terminated polyol, diethanolamine and monoethanolamine.

7. The polyurethane/urea molded elastomer produced by the process of claim 1.

* * * * *